Patented Dec. 1, 1953

2,661,314

UNITED STATES PATENT OFFICE 2,661,314

METHOD OF REMOVING RUST FROM METAL SURFACES

Edward S. Criddle, Columbia, Tenn.

No Drawing. Application December 6, 1951, Serial No. 260,343

2 Claims. (Cl. 134—29)

This invention relates to method of removing rust from metal surfaces, and at the same time provides a preservative which will prevent the further formation of rust on the metal surfaces treated with the rust removing solution.

An important object of the invention is to provide a method using a solution which will be exceptionally cheap to produce to the end that the rust removing or metal treating solution may be freely used on large surfaces wherein the cost of known rust removing or metal preserving solutions is prohibitive, because of the cost of the materials used in such known solutions.

The solution forming the essence of the present invention includes a quantity of blackstrap molasses constituting the active agent of the solution, mixed with water in proportions approximately one pint of blackstrap molasses to five gallons of water.

The ingredients are thoroughly mixed together by stirring, until the blackstrap molasses has become thoroughly dissolved in the water. The solution thus formed has been found to be effective in attacking rust covered surfaces of metal to the end that the rust will readily separate from the metal surfaces.

In using the solution, the metal surfaces to be treated are submerged in a tank containing the solution as described, where the metal is subjected to the action of the solution for a period of at least six days.

Under normal conditions the rust will have been removed from the surfaces by this treatment.

The surfaces under treatment which are now free of all rust particles, are washed with a solution embodying eight ounces of bicarbonate of soda, dissolved in five gallons of water, with the result that the rust removing and metal preserving solution is washed clear from the metal surface being treated, leaving the metal surface free of foreign matter and prepared for painting or coated as desired.

It will be understood that the proportions as herein disclosed are proportions of a solution of a strength to attack the normal rust formations. However, should it be necessary to remove thick layers of rust from metal surfaces, the solution may be strengthened by increasing the amount of blackstrap molasses to be mixed with the five gallons of water.

Having thus described the invention, what is claimed is:

1. A method of removing rust from metal surfaces, consisting in submerging the rust coated surfaces in a solution of blackstrap molasses dissolved in water, subjecting the rust coated surfaces to the action of the solution for a period of substantially six days, and finally subjecting the metal surfaces to the action of a solution of bicarbonate of soda and water removing all foreign matter therefrom.

2. A method of removing rust from metal surfaces, consisting in submerging the rust coated surfaces in a solution of one pint of blackstrap molasses dissolved in five gallons of water, for a period of six days, subjecting the surfaces under treatment to the action of a solution of bicarbonate of soda and water washing the surfaces and removing foreign matter therefrom.

EDWARD S. CRIDDLE.

References Cited in the file of this patent

UNITED STATES PATENTS

| Number | Name | Date |
|---|---|---|
| 1,717,869 | Blumenthal | June 18, 1929 |

OTHER REFERENCES

Uses and Applications of Chemicals and Related Materials, Gregory; Reinhold Pub. Corp., N. Y. (1944), vol. 2 page 223. Copy in Scientific Library.

Cane Sugar Handbook, Spencer-Meade; Wiley & Sons, N. Y., 8th ed. (1945), pages 245–49. Copy in Div. 43.